(No Model.)

J. DEUTSCHBEIN.
REGISTER FOR GAS METERS.

No. 353,781. Patented Dec. 7, 1886.

Witnesses:
S. B. Brewer
H. V. Scattergood

Inventor:
Joseph Deutschbein,
by William H. Low,
Attorney

UNITED STATES PATENT OFFICE.

JOSEPH DEUTSCHBEIN, OF ALBANY, NEW YORK, ASSIGNOR OF ONE-HALF TO WILLIAM McDONALD, OF SAME PLACE.

REGISTER FOR GAS-METERS.

SPECIFICATION forming part of Letters Patent No. 353,781, dated December 7, 1886.

Application filed November 2, 1885. Serial No. 181,577. (No model.)

*To all whom it may concern:*

Be it known that I, JOSEPH DEUTSCHBEIN, of the city and county of Albany, in the State of New York, have invented a new and useful Improvement in Registers for Gas-Meters, of which the following is a specification.

My invention relates to improvements in that class of registers in which the money value of the gas passing through a meter is recorded, instead of the quantity of gas passing through said meter.

The object of my improvement is to produce a registering apparatus provided with a single dial having several hands or indices, which will show at a single glance of the eye the exact cost of the gas that has passed through the meter. This object I attain by means of the mechanism illustrated in the accompanying drawings, which are herein referred to, and form part of this specification.

Figure 1:
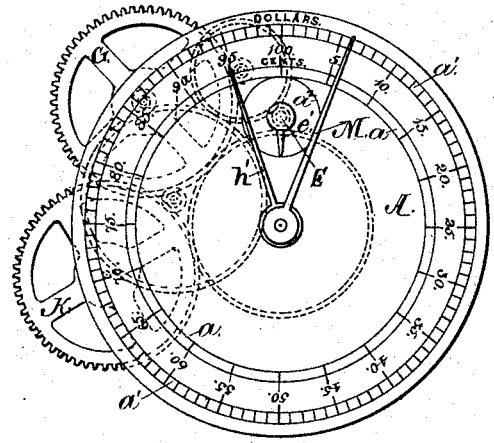
Figure 2:
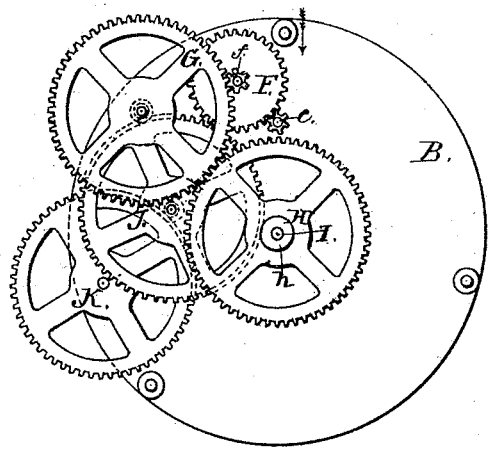
Figure 4:
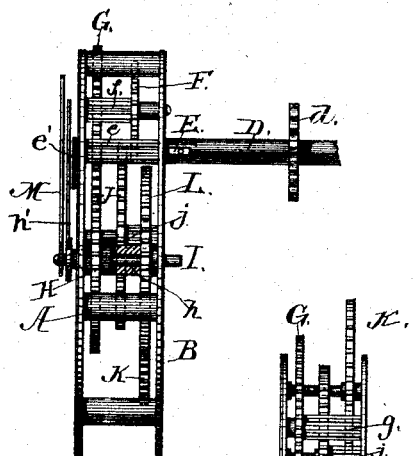
Figure 5:
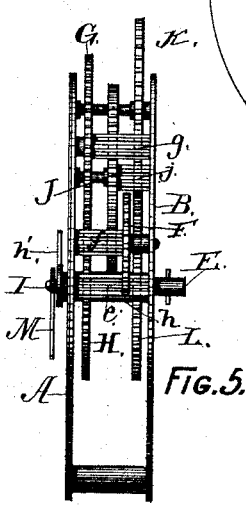
Figure 3:
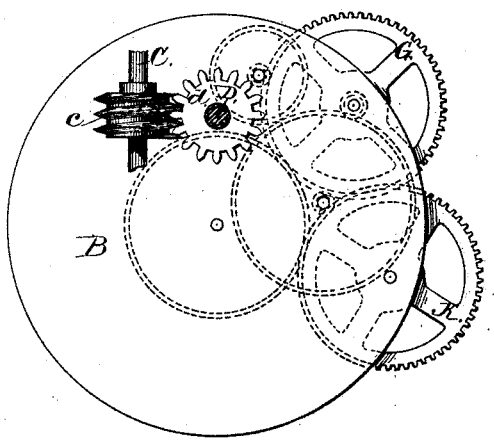

In said drawings, Figure 1 is a front elevation of my register detached from the meter; Fig. 2, the same, with the front plate removed; Fig. 3, a rear elevation showing the mechanism for imparting motion to the train of gearing; Fig. 4, a side elevation of the devices shown in Fig. 3; and Fig. 5, a side elevation, as seen from the direction indicated by the arrow on Fig. 2.

As represented in the drawings, A represents the dial, which also serves as a front plate for the frame-work which carries the train of gearing, and B the back plate of said frame-work.

The dial A consists of a circular plate, and is provided with two concentric graduated scales, the inner scale, $a$, representing one dollar or one hundred cents divided into twenty parts representing five cents each; and the outer scale, $a'$, representing one hundred dollars divided into twenty principal divisions representing five dollars each, and each of the principal divisions being subdivided into five minor parts, each representing one dollar. A small circle, $a^2$, arranged eccentrically to the two concentric scales, is formed near the upper part of the dial A for a purpose hereinafter explained.

C is a vertical spindle, which is operated, in the usual manner of all dry-meters, by the movement of the diaphragms of the meter so that the filling and discharging of all the compartments of the meter will produce one complete revolution of the spindle C. Secured to said spindle is a worm, $c$, which gears into a worm-wheel, $d$, that is attached to a horizontal shaft, D. The latter is detachably coupled to a spindle, E, in line therewith, carrying the pinion $e$, which is the prime mover of the train of gearing whereby the hands of the registering apparatus are operated. A small hand, $e'$, fixed to the spindle E, forms an index for the circle $a^2$, and constitutes the initial index for testing the accuracy of the registering apparatus. The pinion $e$ has six teeth, and gears into the wheel F, having thirty teeth, so that said wheel will be rotated at a speed of one-fifth of the pinion $e$. The wheel F is secured to a spindle which carries a pinion, $f$, having six teeth. The pinion $f$ gears into a wheel, G, having sixty teeth, so that the said wheel will have a speed of one-tenth of that of the pinion $f$, and consequently a speed that is one-fiftieth of that of the pinion $e$; or, in other words, while the pinion $e$ and its attached hand perform fifty revolutions, the wheel G will accomplish one complete revolution. The wheel G gears into a wheel, H, which has the same number of teeth, and consequently an equal rate of speed as the wheel G. The wheel H is secured to a sleeve, $h$, which is fitted to rotate on the central spindle, I. A hand, $h'$, secured to the outer end of the sleeve $h$, indicates on the scale $a$ the value of the gas passing through the meter in fractions of a dollar. The wheel G is secured to a spindle which carries a pinion, $g$, having six teeth. The latter gears into the wheel J, having sixty teeth, and thereby the rate of speed of said wheel as compared to the pinion $g$ is as one to ten. The wheel J is secured to a spindle which carries the pinion $j$, having six teeth, and the latter gears into a wheel, K, having sixty teeth, so that the speed of the latter as compared with the pinion $j$ is as one to ten, and as compared to the pinion $g$ as one to one hundred. The wheel K gears into a wheel, L, both having the same number of teeth, so that both wheels rotate at the same speed. The wheel L is secured to the central spindle, I, which has on its outer end a hand, M, that will indicate on the outer scale, $a'$, the value of the gas passing through the meter in values of from one dollar up to one hundred.

Assuming the capacity of the meter to be one-eighth of a cubic foot for each complete discharge of all its compartments, the worm-wheel $d$ having sixteen teeth, and the worm $c$ making one revolution for each complete filling and discharging of all the compartments of the meter, it follows that by sixteen discharges of the meter (by which two cubic feet of gas will be passed) one complete revolution of the shaft D will be attained, and by fifty revolutions of the shaft D one complete revolution of the sleeve $h$ will be accomplished, and thereby the hand $h'$ will be moved a complete circuit around the inner scale, $a$. Now, assuming the price of gas to be ten dollars per thousand cubic feet, a single revolution of the shaft D will cause the small hand $e'$ to indicate two cents worth of gas; and it follows that fifty revolutions of said shaft, producing a single revolution of the hand $h'$, will indicate that one dollar's worth of gas has passed through the meter.

To adjust the apparatus to register for a different price of gas, it is necessary to change worm-wheel $d$. For instance, if the price is fixed at five dollars per thousand cubic feet, a worm-wheel having thirty-two teeth must be substituted for the one of sixteen teeth shown; and if the price is two and a half dollars, a worm-wheel having sixty-four teeth must be used. For any different price of gas the required number of teeth for the worm-wheel may be readily computed, as it only involves a problem in simple proportion (the quantity of gas required for two cents' worth being known) to determine the number of teeth required in the worm-wheel to produce the required number of revolutions of the shaft D.

I claim as my invention—

The spindle E, constituting the prime mover of a register, in combination with the finger $e'$ mounted thereon, the hands M $h'$ mounted on another shaft, I, like the hands of a clock, a train of gear-wheels interposed between said spindle E and shaft I for the purpose of driving the hands M $h'$ at different rates of speed, and the dial-plate provided with graduated circles for these hands to travel over, and with another circle, $a^2$, eccentric thereto, for the finger $e'$ to travel over in regulating the register, substantially as set forth.

JOSEPH DEUTSCHBEIN.

Witnesses:
   WM. H. LOW,
   S. B. BREWER.